United States Patent [19]

Spaeth et al.

[11] 4,052,187
[45] Oct. 4, 1977

[54] APPARATUS FOR PRODUCING GLASS PARISON BY THE PRESS-AND-BLOW PROCESS

[75] Inventors: Claus Spaeth, Wadgassen; Gunter Wilhelm, Bous; Ingeborg Hammel, Schaffhausen, all of Germany

[73] Assignee: Villeroy & Boch Keramische Werke KG, Germany

[21] Appl. No.: 638,545

[22] Filed: Dec. 8, 1975

[30] Foreign Application Priority Data

Dec. 9, 1974 Germany .............................. 2458233

[51] Int. Cl.² .......................... C03B 9/00; C03B 9/14; C03B 11/00
[52] U.S. Cl. ..................................... 65/160; 65/229; 65/235; 65/261; 65/266; 65/307; 65/161
[58] Field of Search .................... 65/229, 79, 266, 232, 65/235, 237, 261, 307, 161, 160

[56] References Cited

U.S. PATENT DOCUMENTS

| 1,260,637 | 3/1918 | Canfield | 65/232 X |
|---|---|---|---|
| 1,689,975 | 10/1928 | Sloan | 65/235 X |
| 1,834,384 | 12/1931 | Cramer | 65/235 |
| 3,184,298 | 5/1965 | Zonneveld | 65/229 X |
| 3,272,612 | 9/1966 | Hamilton | 65/229 |
| 3,273,991 | 9/1966 | Denman | 65/307 |
| 3,407,055 | 10/1968 | Argyle et al. | 65/261 X |

Primary Examiner—S. Leon Bashore
Assistant Examiner—Frank W. Miga
Attorney, Agent, or Firm—Burns, Doane, Swecker & Mathis

[57] ABSTRACT

Apparatus for producing a glass parison comprises a spindle and a plunger mounted in the spindle for axial displacement. Mechanism is provided for axially displacing the plunger relative to the housing. A press mould has a cavity for carrying glass melt and is movable into a working position aligned with the plunger so that the plunger may enter the mould cavity. A recess is provided in the housing in communication with the mould cavity to receive excess glass melt displaced thereinto in response to positioning of the plunger within the mould cavity. The plunger functions as a valve to alternately block and establish access between a blowing air passage and the front end of the plunger to allow air to be blown against a glass parison being produced. Retaining ring segments which partly define the melt-receiving recess are pivotable between a first position retaining a parison in place, and a second position allowing removal of the parison.

21 Claims, 6 Drawing Figures

APPARATUS FOR PRODUCING GLASS PARISON BY THE PRESS-AND-BLOW PROCESS

BACKGROUND AND OBJECTS OF THE INVENTION

The invention relates to an apparatus for the production of glasses by the press-and-blow process having a plunger which can be forced inside a press mould into a glass melt to form a parison therefrom.

Prior art apparatuses of the kind specified are suitable for the large scale serial production of industrial glasses and therefore enable automatic feeders to be used from which before each pressing operation the press moulds are supplied with a droplet of molten glass of sufficiently constant weight. However, in the manufacture of individual glasses the numbers produced are frequently so small that it is not worthwhile adjusting an automatic feeder to the required droplet weight, since this as a rule is a time-wasting process of trial and error. On the other hand, if the press moulds are manually fed with droplets of molten glass, the droplet weight fluctuates to such an extent that the parisons which can be produced by the prior art apparatuses of the kind specified are very inaccurate and spoil the subsequent blowing which is supposed to be simplified by pressing.

It is, therefore, an object of the invention to provide an apparatus for the production of glasses by the press-and-blow process which, in spite of any inaccurate droplet weight, enables parisons which retain their desired shape and mass to be pressed and quickly further processed by blowing.

BRIEF DESCRIPTION OF A PREFERRED EMBODIMENT OF THE INVENTION

To this end, in an apparatus of the kind specified according to the invention the plunger is guided with provision for axial displacement in a plunger ring. A retaining ring encloses the parison and is connected in a sealing-tight manner to the press mould during pressing. The plunger ring and retaining ring bound therebetween an annular gap. Located radially outside the gap is a compensating chamber for excess molten glass. Downward movement of the plunger causes excess molten glass to be forced into the compensating chamber.

As a result, operations can always be performed with a varying excess of molten glass, since the compensating chamber receives such excess.

Operation with a planned excess, the amount of which may vary, makes possible both reliable manual operation and the use of an automatic feeder with fixed droplet weights to manufacture glasses of different useful weight. For instance, a number of apparatuses according to the invention can be disposed for the manufacture of glasses of different weights beneath a single feeder, from which each of the apparatuses is fed in a regular cycle via a separate channel. In this way economic use can be made even for small scale serial production of a rapid-action automatic feeder with a cutting sequence of eight per minute. The compensating chamber of each individual apparatus according to the invention is filled to a varying extent by the excess molten glass and ensures that the cavity between the press mould and the plunger is always completely filled with molten glass in the pressing end position of the plunger.

Advantageously, the plunger ring and/or the retaining ring has on its side adjacent the annular gap a labyrinth of annular or spiral grooves. Preferably the annular or spiral grooves have a serrated cross-section with steep, preferably perpendicular flanks on their side adjacent the plunger, and inclined flanks on their side removed therefrom. As a result the glass can readily flow into the compensating chamber and is then substantially retained therein. The labyrinth also improves the seal between the plunger ring and the parison and therefore contributes towards maintaining a constant blowing pressure during the subsequent blowing operation.

Preferably, the retaining ring is made up of at least two segments which can be moved away laterally for the removal of the parison. Conveniently, each segment of the retaining ring can be pivoted around a pivoting axis which, when the plunger is vertical, is disposed at the level of the compensating chamber or thereabove and intersects at a distance the axis of the plunger.

In a preferred embodiment of the invention, on its inside the plunger ring has a seat which cooperates with a complementary annular surface of the plunger to limit its movement into the press mould. Also, the plunger ring separates the space provided for the parison on the front side of the plunger from a distributing chamber which is provided on the rear side of the plunger inside the plunger ring. This distributing chamber can be connected to a blowing air passage and, by the lifting of the plunger off the seat, can be connected to the inside of the parison. This arrangement enables the parison which has just been pressed and is still retained by the retaining ring to be subjected to the further blowing operation without any intermediate conveying.

Conveniently, the plunger ring is bell-shaped and attached to the end of a tube which is disposed for the displacement of the plunger ring. The tube is mounted within a hollow spindle that is driven in rotation, the tube being connected for co-rotation to the spindle and longitudinal displacement therein. The tube encloses a pressing rod rigidly connected to the plunger. As a result, the parison can be rotated around its own axis during blowing, while a space-saving arrangement is provided for the plunger-actuating means and the plunger ring.

The last mentioned embodiment can be further developed by the feature that the spindle has a cylinder in which one or the other end face of a piston rigidly connected to the tube can be acted upon at choice by a pressurized fluid. As a result the movements of the plunger ring can be controlled hydraulically or penumatically, for instance by compressed air, which is in any case available for blowing.

According to a possible feature of the invention the spindle has a bell-shaped end portion which encloses the plunger ring and has on its outside a socket which can be rotated together with the spindle and adjusted for moving away the segments of the retaining ring. The retaining ring can therefore be opened and closed whether the spindle is rotating or stationary.

Advantageously, in an apparatus of the kind specified, more particularly having the characteristic features of accompanying claim 1, the spindle is mounted in a headstock which can be pivoted around at least a substantially horizontal pivoting axis. As a result, the parison clamped between the plunger ring and the retaining ring and co-rotating therewith can be delivered upwards out of an originally vertically downward-pointing position before or during blowing, to buffer the parison in known manner or to complete its blowing directly, before the parison is released for the first time from the plunger ring used during pressing. More particularly, however, the pivotability of the headstock enables the wall thickness distribution in the first place produced by the shape of the plunger to be designed as required by pivoting the parison upwards and then allowing it to sag. In this way, for instance, glasses can be produced whose side walls have a thickness adequate for the application of very deep ground decorations, without their rims or bottoms being too thick.

According to a possible feature of the invention, disposed beneath the plunger is a photoelectric cell which during the sagging of the parison released from the press mould actuates a switch for movement of a blow mould as soon as the parison has reached a predetermined length.

Preferably, the press mould, alternating with a blow mould, can be moved out of an inoperative position into an operative position beneath the plunger. While the press mould together with the plunger determines the original shape of the parison, the blow mould enables a substantially finished glass of precisely predetermined outline to be blown from the parison before the plunger ring and retaining ring are moved apart and the glass therefore released. All that must then be done is to remove the excess glass which has solidified in the compensating chamber.

DRAWINGS

An embodiment of the invention will now be described with further advantageous details, with reference to the diagrammatic drawings, wherein:

FIG. 1 is a front elevation of an apparatus for the production of glasses by the press-and-blow process, FIG. 2 is a side elevation of the apparatus;

FIGS. 3a and 3b show the top and bottom parts respectively of the section III—III in FIG. 1, in the position of the apparatus immediately after the pressing of a parison, FIG. 4 is a section, corresponding to FIG. 3b, with the apparatus in its position at the start of blowing, and FIG. 5 is a section, corresponding to FIG. 3b, with the apparatus in its position after the removal of the blown glass.

DETAILED DESCRIPTION OF THE PREFERRED EMBODIMENT

Figure 1:
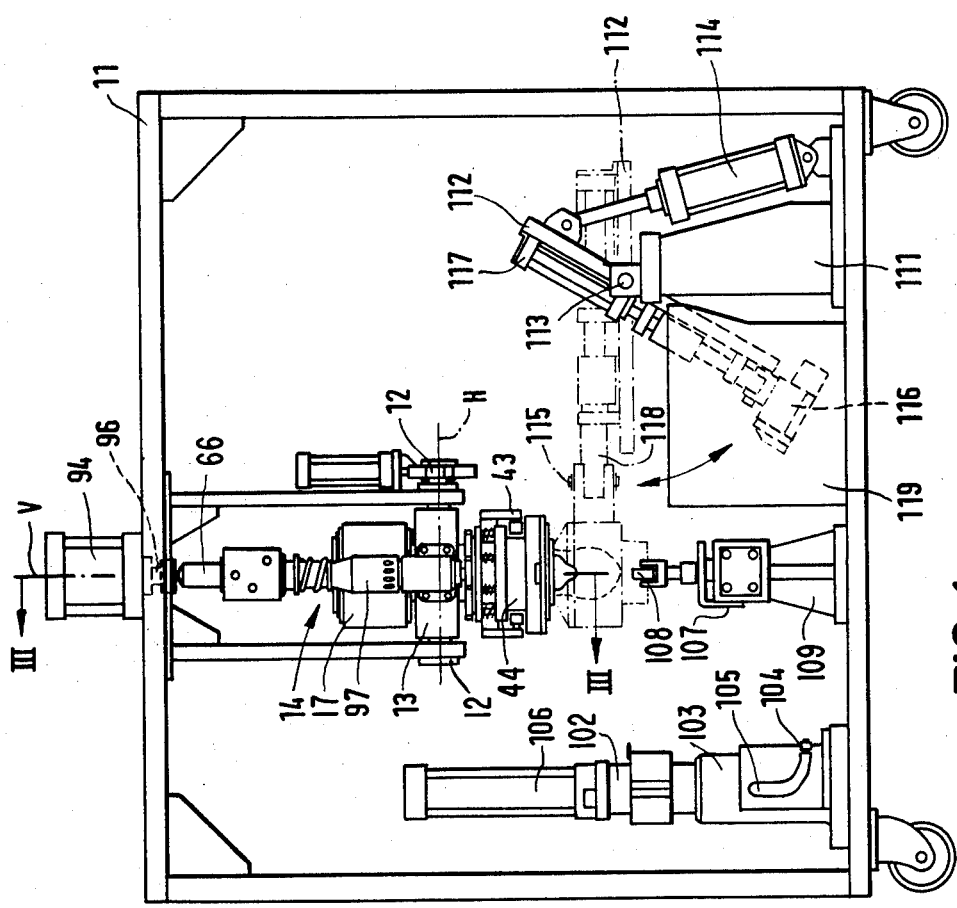

The apparatus (FIG. 1) comprises a traveling frame 11 having a pivotable bearing 12 which mounts for rotation a headstock 13 carrying a spindle 14. The spindle 14 is also mounted to rotate around its own axis V in the headstock 13. The bearing 12 enables the headstock 13 to pivot around a horizontal axis H, so that the spindle 14 can occupy at choice the position shown in solids lines in FIG. 1 in which the axis of rotation V is vertical (i.e., perpendicular to horizontal), or the position indicated by chain-dot lines in FIG. 2, in which the axis of rotation V is directed at an upward inclination.

Figure 3A:
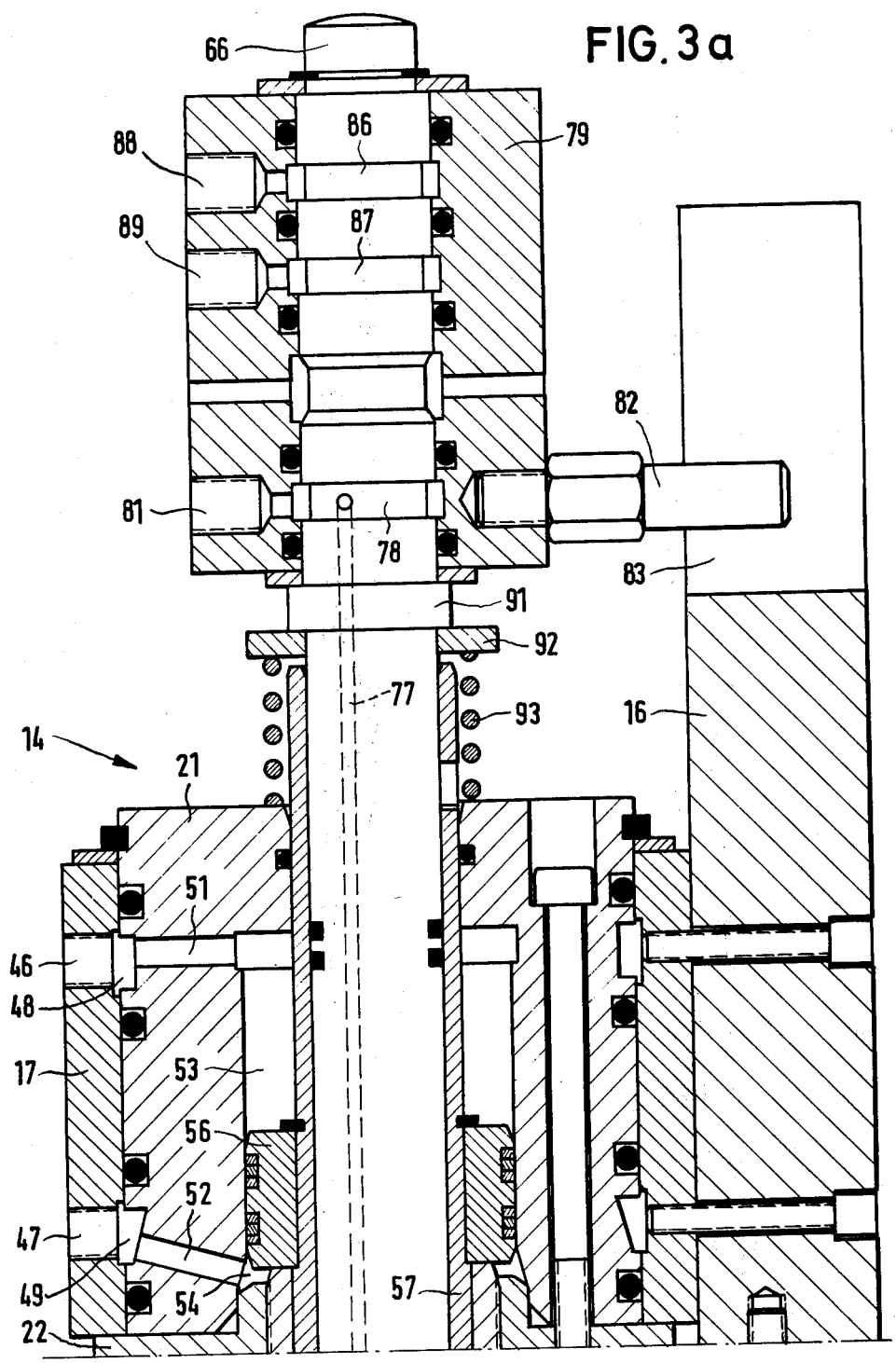
Figure 3B:
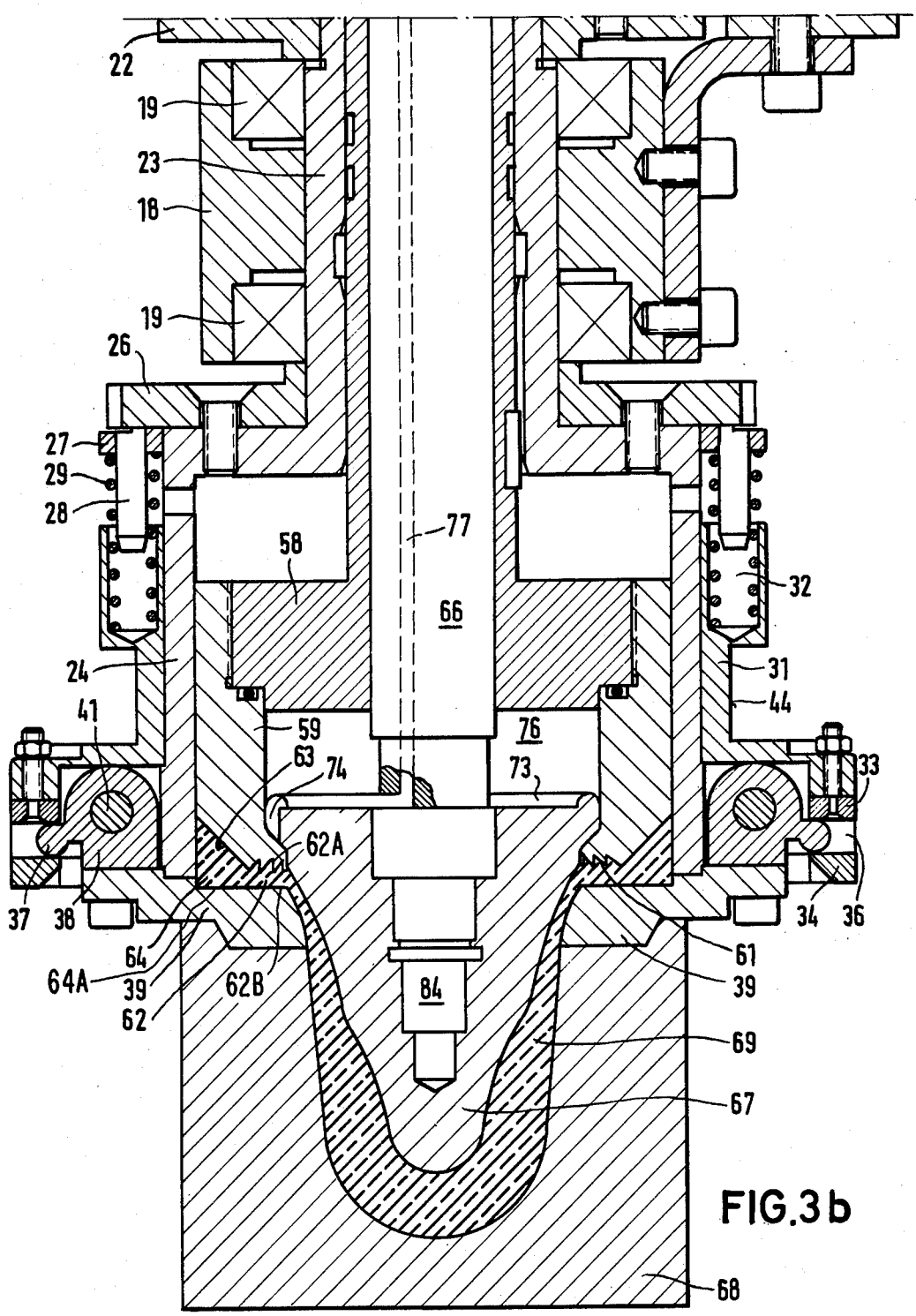

As shown in FIGS. 3a and 3b, the headstock 13 comprises a plate 16 to which a cylinder casing 17 and a bearing casing 18 are attached. The spindle 14 is mounted axially undisplaceably by two ball bearings 19 in the bearing casing 18.

The main components of the spindle 14 include: a cylinder 21 which is rotatably disposed in the cylinder casing 17 and whose underside is closed by a bottom plate 22; a central part 23 extending through the ball bearings 19; a bell-shaped end portion 24; and a gearwheel 26 attached at the transition between the middle part 23 and the end portion 24. As will be discussed, the spindle defines a housing for a slidable plunger which enters a mould cavity.

Disposed on the underside of the gearwheel 26 is a thrust ring 27 to which pins 28 parallel with the axis of rotation V are attached. The pins 28 are enclosed by helical springs 29 which are clamped as compression springs between the thrust ring 27 and a socket 31. The socket 31 is guided with provision for axial displacement in the direction of the axis of rotation V on a cylindrical section of the end portion 24. The socket 31 is formed with bores 32 of parallel axes in which the pins 28 and springs 29 are received to a varying extent, depending upon the position of the socket 31. The socket 31 widens bell-shape downwards and at that place carries two rings 33, 34 which can be adjusted axially in relation to one another and are spaced to define recesses 36 between themselves.

Figure 4:
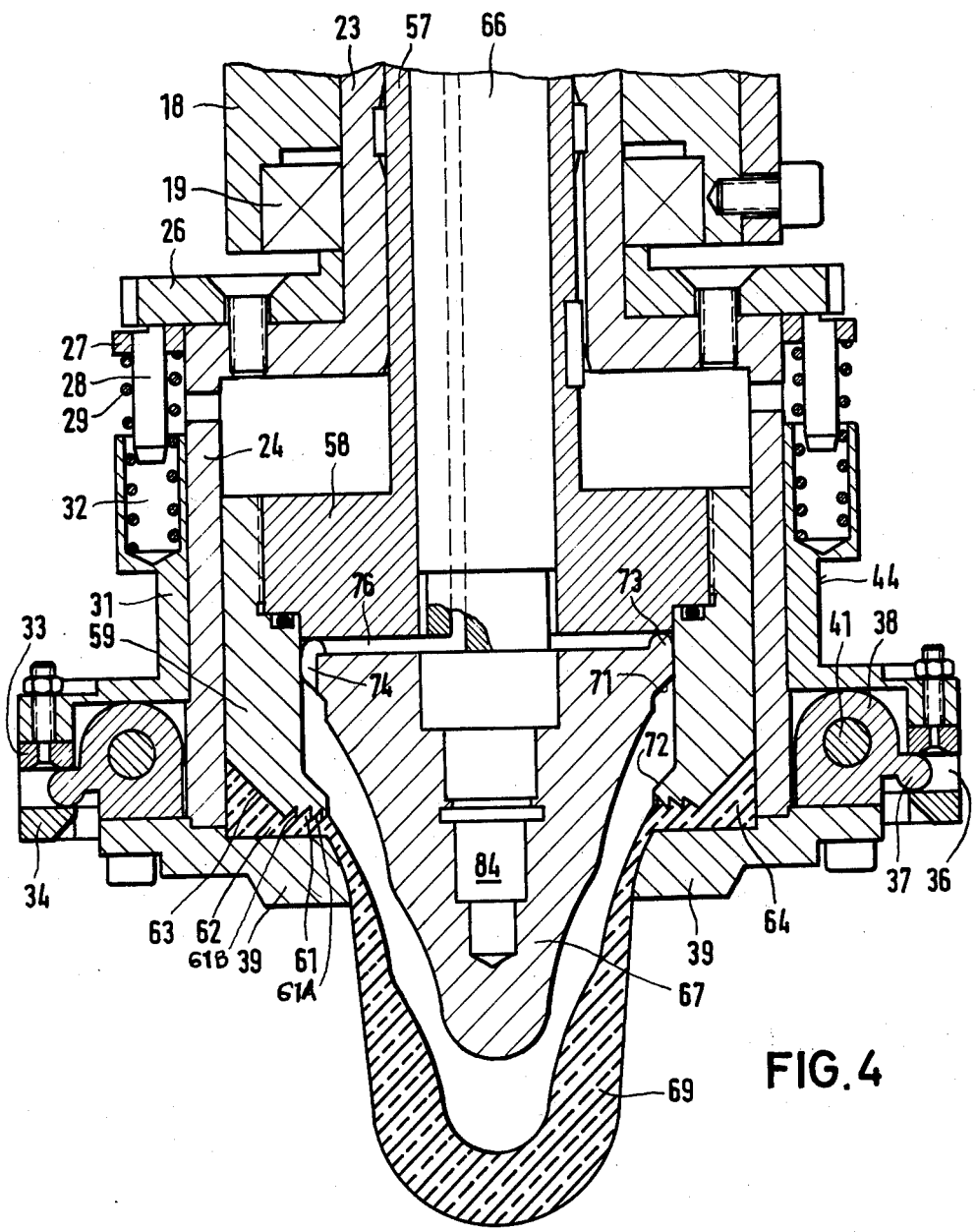

Engaging in each of recesses 36 is a part-cylindrical cam 37 which is of unitary construction with a bearing part 38. Each bearing part 38 carries one segment of a retaining ring 39 which, in a closed condition, is disposed coaxially with the spindle 14 (FIGS. 3b and 4). Each bearing part 38 can pivot around a pivot 41 which extends at a distance from and at a right angle (i.e., orthogonally) relative to the axis of rotation V and is rigidly connected via bearing lugs 42 (FIG. 5) to the end portion 24 of the spindle 14. The segments of the retaining ring 39 can be pivoted away from one another to an open position by the socket 31 being displaced upwardly along the axis of rotation V, in the direction of the thrust ring 27. A fork 43 (FIG. 1) engaging in an annular groove 44 in the socket 31 is used to displace the latter in this manner.

The cylinder casing 17 has a top connection 46 and a bottom connection 47 for a pressurized fluid preferably compressed air. These two connections are connected via a top annular groove 48 and a bottom annular groove 49, and a top radial bore 51 and a bottom radial bore 52, to a top cylinder chamber 53 and a bottom cylinder chamber 54, respectively inside the cylinder 21. The two cylinder chambers 53, 54 are separated by an annular piston 56 attached to a tube 57 which is housed within the spindle 14. The tube is guided for axial displacement in the central part 23 of the spindle 14 and is connected to the spindle for co-rotation therewith.

The bottom end of the tube 57 is formed with a flange part 58 to which a plunger ring 59 is interchangeably screwed. The axially outwardly facing bottom end surface of the plunger ring 59 has a first surface portion 62A, preferably in the form of a labyrinth 61 formed via annular, or spiral, grooves. The retaining ring 39 includes, on its axially inwardly facing upper end, a first surface portion 62B facing the surface portion 62A.

In the bottom position of the plunger ring 59, which is determined by the piston 56 abutting the central part 23 of the spindle 14 (FIGS. 3a, 3b), the surface portions 62A, 62B are spaced to define an annular gap 62 between the labyrinth 61 and the retaining ring 39. Radially outside the labyrinth 61 the plunger ring 59 has a second surface portion in the form of a frustoconical chamfer 63 laterally spaced adjacent its associated first surface portion 62A and extending at an angle relative thereto which cooperates with a second surface portion 64A the retaining ring 39 and the inside wall of the end portion 24 of the spindle 14 to bound a compensating chamber 64. The grooves of the labyrinth 61 have a serrated cross-section with steep, preferably perpendicular flanks 61A on their side adjacent the plunger, and inclined flanks 61B on their side removed therefrom. As a result, glass melt can readily flow into the compensating chamber 64 and is then substantially retained therein. The labyrinth 61 also improves the seal between the plunger ring and the parison and therefore contributes towards maintaining a constant blowing pressure during the subsequent blowing operation.

Guided with provision for axial displacement in the tube 57 is a pressing rod 66 to whose end (bottom end as shown in the drawings) a plunger 67 is interchangeably screwed. The plunger 67 is a body of rotation, preferably made of steel, whose axis corresponds to the axis of rotation V. Associated with the plunger 67 is a press mould 68 which, when a mold cavity thereof is filled with molten glass, can be forced coaxially toward the plunger 67 from below until abutting against the retaining ring 39. When the plunger is disposed in the mould, it forms therewith a shaping cavity. That is, the press mould 68 determines the outer shape of a hollow glass parison 69 whose cavity is produced by pressing the plunger 67 into the press mould 68.

With the press mould disposed in a working position, the annular gap 62 communicates the mould cavity with the chamber 64. As will be discussed, positioning of the plunger 67 within the mould cavity serves to force excess glass melt into the recessed area defined by the gap 62 and chamber 64.

The plunger 67 has a frustoconical outer annular surface 71 (FIGS. 4 and 5) with which a complementary seat 72 on the inside of the plunger ring 59 is associated. The annular surface 71 bears tightly against the seat 72 when the plunger 67 (FIG. 3b) occupies its end position remote from the flange part 58 of the tube 57. The side of the plunger 67 adjacent the flange part 58 also has an annular bead 73 which limits the movement of the plunger 57 in the direction of the flange part 58 and is interrupted by longitudinal grooves 74. There always remains unobstructed between the pressing rods 66 and the annular bear 73 a distributing chamber 76 which is connected via a blowing air passage 77 and an annular groove 78 in the pressing rod 66 to the inside of a distributing bush 79 disposed above the cylinder 21 and also to a blowing air inlet 81 provided on the bush 79.

Attached to the distributing bush 79 is a pin 82 engaging in a slot 83 in the plate 16. As a result the distributing bush 79, rigidly connected axially to the pressing rod 66, can make axial movements without rotating together with the spindle 14. The distributing bush 79 is connected via two passages of parallel axis (not shown) in the pressing rod 66 to a cavity 84 in the plunger 67; the passages each terminate in an annular groove 86; 87 which is connected to a coolant inlet 88 and a coolant outlet 89 respectively in the distributing bush 79.

Figure 5:
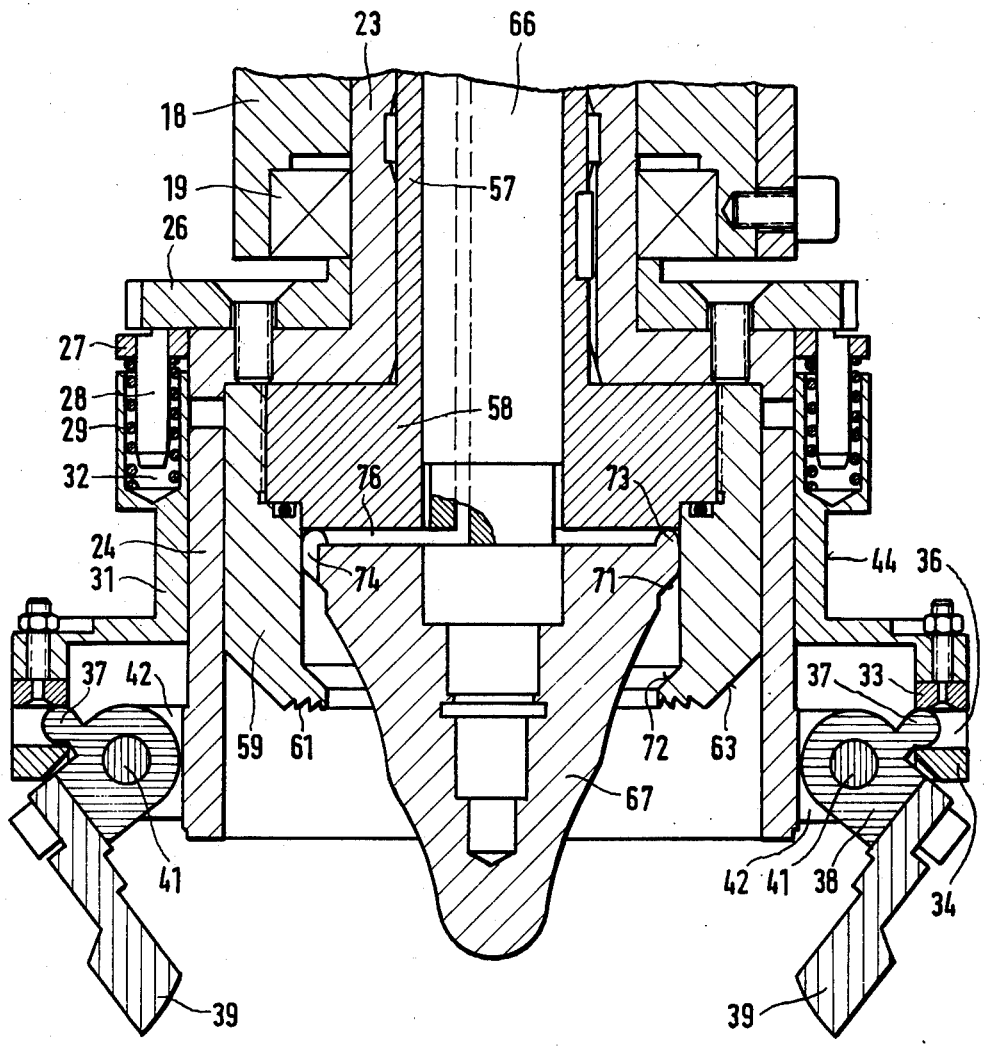

Between the distributing bush 79 and the end of the tube 57 (top end as shown in FIG. 3a), the pressing rod 66 has a collar 91 against whose underside a ring 92 bears. Clamped between the ring 92 and the cylinder 21 is a helical compression spring 93 which tends to displace the pressing rod 66 and the plunger 67 upwardly into a position in which the annular bead 73 bears against the flange part 58 of the tube 57 (FIGS. 4 and 5). A pressing cylinder 94 (FIGS. 1 and 2), which is attached to the frame 11 and whose piston rod 96 can press against the pressing rods 66 when the latter is vertical, enables the plunger 67 to be forced away from the flange part 58 against the seat 72 of the plunger ring 59, in opposition to the force of the compression spring 93.

Attached to the headstock 13 is a motor 97 driving a pinion 98 meshing with the gearwheel 26.

Figure 2:
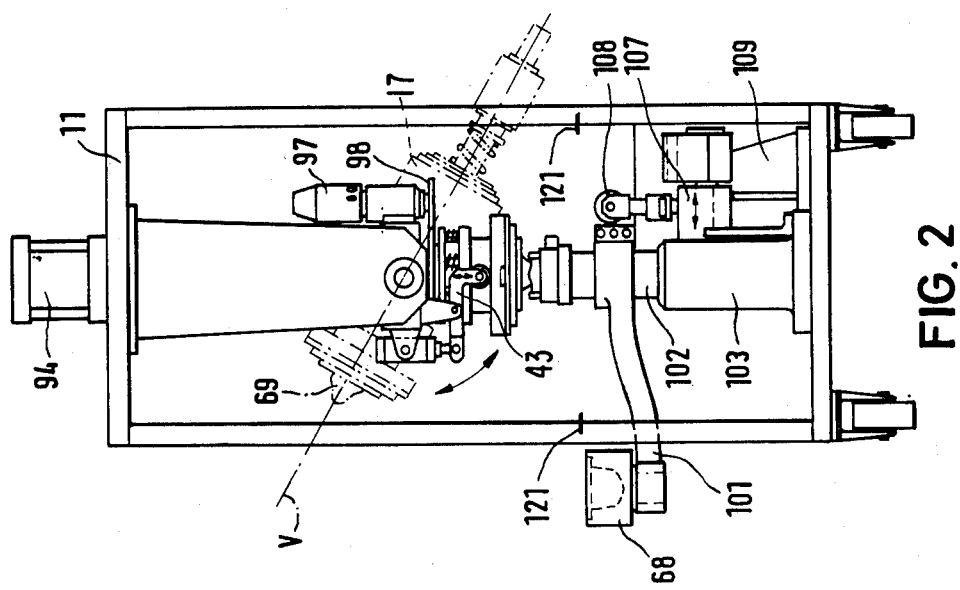

The press mould 68 is interchangeably attached to the free end of an arm 101 clamped on a vertical tubular column 102. The column 102 is vertically adjustably and rotatably mounted in a hollow upright 103 attached to the frame 11 (FIG. 2). Attached to the bottom end of the column 102, disposed inside the upright 103, is a radial pin on which a cam-follower roller 104 is mounted. The roller 104 runs in a guide slot 105 having a bottom spiral portion, and a top, vertical portion. Attached to the column 102 is the cylinder of a fluid-pressure-actuated actuator 106 whose piston rod (not shown) extends downwards through the column 102 and is attached to the upright 103. When the piston rod is extended, the cam-follower roller 104, starting from the position shown in FIGS. 1 and 2, first passes through the spiral portion of the guide slot 105. As a result, the column 102, with the arm 101, is only slightly raised and, more particularly, is turned through 90°, until the press mould 68 is vertically below the plunger 67. Further extension of the piston rod results in the roller 104 running through the vertical portion of the guide slot 105, so that the column 102 with the arm 101 then only moves upwards and is completely prevented from rotating.

A bearing carriage 107 on which a bearing roller 108 is mounted with provision for vertical adjustment is provided to bear the press mould 68 in its working or press position. The bearing carriage 107 is guided on a block 109 attached to the frame 11 with provision for horizontal and parallel displacement in the plane of the drawing (FIG. 2). In this manner, the carriage can be displaced from its inoperative position shown in FIG. 2 into a working position, with the bearing roller 108 moving under the press mould 68 already located in its working position.

Attached to the frame 11 is a further upright 111 on which a two-armed lever 112 is mounted to tilt around a horizontal pivot 113. The lever 112 can be pivoted by a fluid-pressure-actuated-actuator 114 out of its inoperative position, shown partly in solid lines and partly by broken lines in FIG. 2, into a horizontal working position (shown fully in chain-dot lines). Pivotably mounted at the free end of the lever 112 on a pin 115 disposed vertically in the working position, are two halves of a two-part blowing mould 116. The blowing mould 116 is opened and closed by a fluid-pressure-actuated-actuator 117 whose cylinder is attached to the lever 112 and whose piston rod is pivotably connected via a strap 118 to each of the two halves of the blowing mould. In an inoperative position the blowing mould 116 is immersed in a water tank 119 for cooling purposes. In a working position the blowing mould 116 adjoins the retaining ring 39 coaxially from below, in a similar manner to that of the press mould 68.

Also disposed on the frame 11 with provision for vertical adjustment is a photoelectric cell 121 whose ray of light is interrupted by the parison 69 when the latter has sagged to the required length.

The apparatus illustrated more particularly in FIGS. 3a–5 operates as follows: After a finished, blown glass has been removed, the apparatus occupies the operational position illustrated in FIG. 5. Subsequently, the retaining ring 39 is closed by releasing the fork 43, so that the springs 29 force the socket 31 away from the thrust ring 27 into the end position shown in FIGS. 3b and 4. Then the press mould 68, partly filled with molten glass, is forced from below against the retaining ring 39 and into a press position. Then the plunger 67 is forced downwardly by the pressing cylinder 94 against the resistance of the compression spring 93 inside the plunger ring 59, until the annular surface 71 of the plunger bears tight against the seat 72 of the plunger ring. Lastly, the plunger 67 and the plunger ring 59 move downwards together, with the plunger being immersed in the molten glass. The outer wall of the plunger 67 and the inner wall of the mould cavity define a preselected volume. In the event that the volume of glass melt exceeds this preselected volume, the excess portion thereof is forced through the annular gap 62 and into the compensating chamber 64. As soon as the plunger ring 59, together with the plunger 67, has reached its bottom end position, determined by the piston 56 abutting the central part 23 of the spindle 14, a parison 69 has been formed from the molten glass. After a brief cooling period, the press mould 68 is drawn away from the parison 69 along the axis of rotation V and the spindle 14, including the retaining ring 39, plunger ring 59, plunger 67 and parison 69, is rotated by the motor 97.

The headstock 13, together with the spindle 14, is then pivoted around the pivoting axis H, so that the parison 69 (indicated in chain-dot lines in FIG. 2) is directed at an upward angle, while the spindle 14 continues to rotate. This pivoting serves to separate the pressing rod 66 from the piston rod 96 on the pressing cylinder 94, so that the plunger 67 (FIG. 4) is again forced against the flange part 58 by the spring 93. Blowing air from the distributing chamber 76 enters the inside of the parison 69 through the resulting annular gap between the annular surface 71 and the seat 72, with the parison still gripped between the plunger ring 59 and retaining ring 39. While it is being continuously rotated and acted upon with blowing air from the inside, the parison 69 can be processed from outside, using a pot-shaped template, in a conventional manner.

As soon as the parison 69 has taken on the required preliminary shape and wall thickness distribution for the final glass, the headstock 13 with the spindle 14 is again pivoted around the pivoting axis H into the position in which the axis of rotation V is vertical (FIG. 1) and the opened blowing mould 116 is moved into the working position.

If required, the spindle 14 can be temporarily stopped during the subsequent sagging of the parison. The sagging, during which the parison is elongated, also affects the wall thickness distribution of the final product. The correct length is controlled by the photoelectric cell 121. When the final value is reached, the blowing mould 116 encloses the parison 69 and further blowing air is supplied to blow the parison to form the end product corresponding to that outline of the blow mould. Then the blow mould is opened and tilted down into the water tank 119. Lastly, the spindle 14 is finally stopped, the plunger ring 59 is moved into its top end position by the introduction of pressurized fluid into the bottom cylinder chamber 54, and the segments of the retaining ring 39 are pivoted apart (FIG. 5), the socket 31 being displaced upwards by the fork 43. The finished glass is removed and the operational cycle described starts all over again.

The present invention provides a compact and highly efficient apparatus for producing glass parisons. The apparatus can be used with or without an automatic feeder, that is, with molten droplets of constant or varying weight. In the event that an excess of melt is present, such excess will be forced from the mould cavity and into the recessed area 62, 64 communicating therewith. The grooved arrangement 61 for the recessed area facilitates one-way travel of the melt. The recessed area is defined by movable retainer ring segments which retain the parison in place, or allow it to be removed. Conveniently, the seat surface arrangement 71–72 functions as a stop and somewhat like a valve to alternately block and establish communication between the blowing passage 77 and the parison.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. An apparatus to be used in the production of a glass parison by a press-and-blow process in which a press mould and an annular gap surrounding said mould are to be filled with a change of glass melt, said apparatus comprising:
   a plunger ring having a chamber therein;
   a plunger movable in said plunger ring chamber for axial displacement relative to the press mould, said plunger when moved into said press mould defining therewith a shaping cavity; and
   neck retaining ring means mounted to enclose a parison and tightly abut against said press mould in a sealing manner during pressing;
   said plunger ring including a first surface portion on an axially outwardly facing end thereof and said retaining ring means including a first surface portion on an axially inwardly facing end thereof, when said plunger is in a molding position in said pressing mould said first surface portion of said plunger ring is spaced from said first surface portion of said retaining means to cooperatively define therewith said annular gap such that said annular gap surrounds the plunger and communicates with said press mould to receive glass melt forced from said mould by said plunger;
   said plunger ring including a second surface portion laterally spaced adjacent its associated first surface portion and said retaining ring means including a second surface portion laterally spaced adjacent its associated first surface portion, said second surface portion of said plunger ring being spaced from said second surface portion of said retaining ring means and at least one of said second surface portions extending at an angle relative to its associated first surface portion so that when said plunger is in a moulding position in said press mould, said second surface portions are cooperatively arranged to define an enlarged, annular compensating chamber located radially outwardly of said annular gap and communicating therewith to compensate for the presence of an amount of charge which is in excess of that filling said shaping cavity and said annular gap, by receiving such excess.

2. Apparatus according to claim 1 wherein said plunger includes an air passage for conducting air to be directed against a parison when said plunger is removed from said parison; said first surface portion of said plunger ring including a labyrinth of grooves in which glass melt enters when forced from said shaping cavity, to establish an air seal between said plunger ring and the glass parison.

3. Apparatus according to claim 1 wherein said retaining ring means comprises at least two segments that are mounted for shifting movement away from enclosing relationship with a parison to allow removal of the parison.

4. Apparatus according to claim 3 wherein each of said segments is mounted for pivotal movement about a pivot axis; said axis being disposed at substantially the same level as said compensating chamber and orthogonally relative to a longitudinal axis of said plunger when said plunger is disposed in a vertical position.

5. Apparatus according to claim 1 wherein said plunger includes an annular surface located adjacent a rear end portion thereof and disposed at an angle relative to the direction of travel of said plunger; and said plunger ring includes a correspondingly angled annular seat aligned axially with said annular surface so as to be disposed in the path of travel of said annular surface to define a stop which limits forward movement of said plunger into the press mould; said plunger ring and said plunger defining air channel means around the outside of said plunger to communicate front and rear portions of said plunger; a blowing air passage communicating with said air channel means for delivering air to be blown against a parison; communication between said air channel means and the front portion of said plunger being blocked by engagement between said annular surface and said seat when said plunger is in its forward position in said press mould; said plunger being movable away from said seat to communicate said air channel means with the front end of said plunger to allow air to be blown against a parison.

6. Apparatus according to claim 2 wherein said plunger includes an annular surface located adjacent a rear end portion thereof and disposed at an angle relative to the direction of travel of said plunger; and said plunger ring includes a correspondingly angled annular seat aligned axially with said annular surface so as to be disposed in the path of travel of said annular surface to define a stop which limits forward movement of said plunger into the press mould; said plunger ring and said plunger defining air channel means around the outside of said plunger to communicate front and rear portions of said plunger; a blowing air passage communicating with said air channel means for delivering air to be blown against a parison; communication between said air channel means and the front portion of said plunger being blocked by engagement between said annular surface and said seat when said plunger is in its forward position in said press mould; said plunger being movable away from said seat to communicate said air channel means with the front end of said plunger to allow air to be blown against a parison.

7. Apparatus according to claim 1 further including hollow spindle means for rotating said spindle; a tube mounted to said plunger ring for longitudinal displacement within said hollow spindle and for co-rotation with said spindle; and a pressing rod displaceably mounted within said tube and being rigidly connected to said plunger.

8. Apparatus according to claim 6 further including a hollow spindle means for rotating said spindle; a tube mounted to said plunger ring for longitudinal displacement within said hollow spindle and connected to said spindle for co-rotation therewith; and a pressing rod displaceably mounted within said tube and being rigidly connected to said plunger.

9. Apparatus according to claim 7 wherein said spindle has a cylinder defining a cylinder chamber; a piston being movably mounted within said cylinder chamber; said piston being connected to said tube; and means for introducing pressurized fluid within said chamber to displace said piston and said tube.

10. Apparatus according to claim 8 wherein said spindle has a cylinder defining a cylinder chamber; a piston being movably mounted within said cylinder chamber; said piston being connected to said tube; and means for introducing pressurized fluid within said chamber to displace said piston and said tube.

11. Apparatus according to claim 7 wherein said spindle includes a bell shaped end portion which encloses said plunger ring; said end portion having a socket member which is mounted for co-rotation with said spindle; said socket member being operably connected to said retaining ring means to move said retaining ring means away from enclosing relationship with the parison to allow removal of the parison.

12. Apparatus according to claim 10 wherein said spindle includes a bell shaped end portion which encloses said plunger ring; said end portion having a socket member which is mounted for co-rotation with said spindle; said socket member being operably connected to said retaining ring means to move said retaining ring means away from enclosing relationship with the parison to allow removal of the parison.

13. Apparatus according to claim 7 including a headstock mounted for pivotal movement about a substantially horizontal pivot axis; said spindle being mounted to said headstock for pivotal movement therewith.

14. Apparatus according to claim 12 including a headstock mounted for pivotal movement about a substantially horizontal pivot axis; said spindle being mounted to said headstock for pivotal movement therewith.

15. Apparatus according to claim 1 further including a photoelectric cell disposed a predetermined distance beneath said plunger for actuating a switch for movement of a blow mould in response to the parison sagging to said predetermined distance.

16. Apparatus according to claim 14 further including a photoelectric cell disposed a predetermined distance beneath said plunger for actuating a switch for movement of a blow mould in response to the parison sagging to said predetermined distance.

17. Apparatus according to claim 10 further including a blow mould mounted for movement to an operative position beneath said plunger in the absence of said press mould.

18. Apparatus according to claim 16 further including a blow mould mounted to movement to an operative position beneath said plunger in the absence of said press mould.

19. Apparatus according to claim 1 wherein the volume of said annular compensating chamber is greater than the volume of said annular gap.

20. Apparatus according to claim 1 further including a housing in which said plunger ring is axially slidably mounted, a portion of said housing forming a wall of said compensating chamber, and an end face of said housing being positioned to abut against said retaining ring means when the latter encloses a parison.

21. Apparatus according to claim 1 wherein one of said first surface portions includes a labyrinth of grooves oriented to facilitate the travel of melt toward said compensating chamber to inhibit travel of melt from said chamber.

* * * * *